Jan. 15, 1924. 1,480,998
J. DLESK.
METHOD OF ASSEMBLING BALL BEARINGS
Filed Feb. 10, 1922
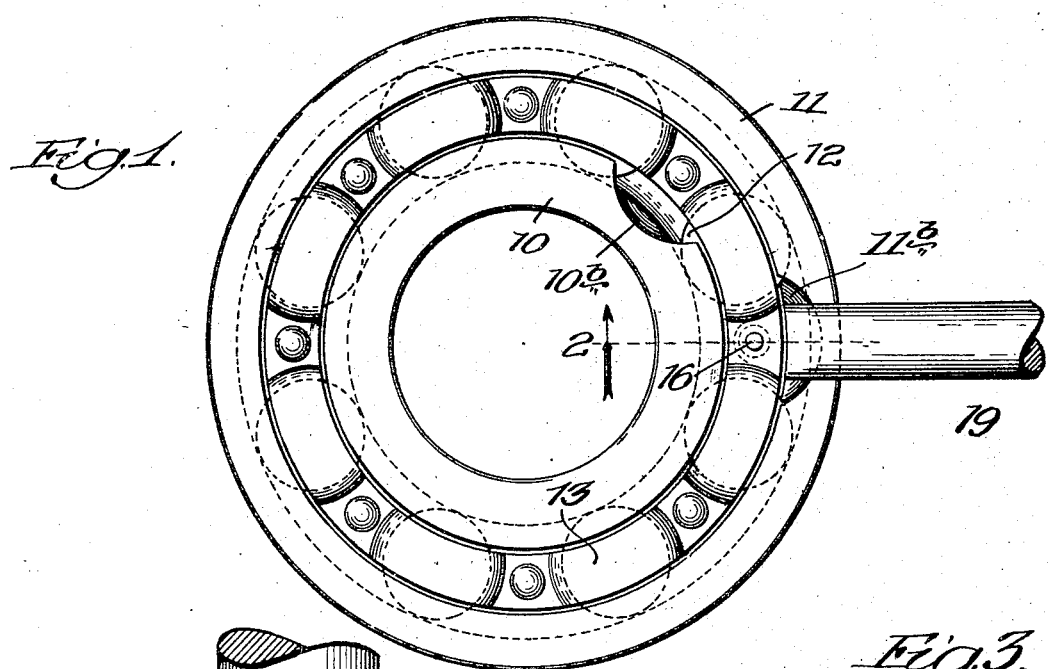
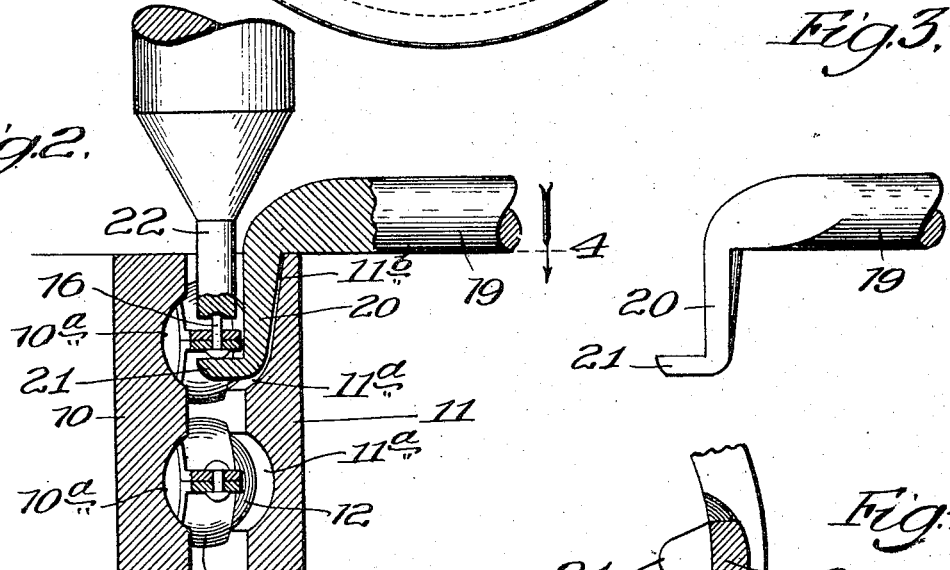
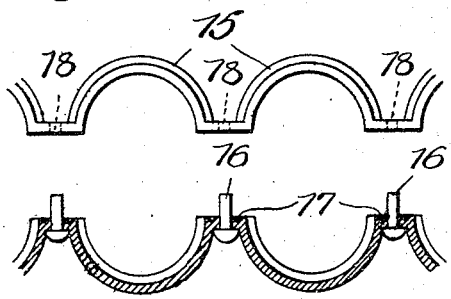

Patented Jan. 15, 1924.

1,480,998

UNITED STATES PATENT OFFICE.

JOHN DLESK, OF BERWYN, ILLINOIS, ASSIGNOR TO U. S. BALL BEARING MANUFACTURING COMPANY, OF CHICAGO, ILLINOIS, A CORPORATION OF ILLINOIS.

METHOD OF ASSEMBLING BALL BEARINGS.

Application filed February 10, 1922. Serial No. 535,531.

*To all whom it may concern:*

Be it known that I, JOHN DLESK, a citizen of the United States, residing at 1406 Union Avenue, Berwyn, in the county of Cook and State of Illinois, have invented a new and useful Improvement in Methods of Assembling Ball Bearings, of which the following is a specification.

This invention relates to a method for assembling two-row radial ball bearings, and the like, and is fully described in the following specification and shown in the accompanying drawings, in which:

Figure 1 is a plan view of a two-row radial bearing being assembled by this method;

Fig. 2 is a vertical section on the line 2 of Fig. 1;

Fig. 3 is a partial side elevation of a dolly;

Fig. 4 is a partial plan view on the line 4 of Fig. 2; and

Fig. 5 is a developed partial side elevation of the two halves of the ball retainer previous to being assembled.

The two-row radial bearing as illustrated consists of inner and outer race members 10 and 11 respectively which have parallel race-ways 10$^a$ and 11$^a$ formed therein. Balls 12 are introduced into these grooves through the well known filling notches 10$^b$ and 11$^b$ which are formed in the inner and outer race members respectively.

In assembling bearings of this kind, it is a very simple matter to assemble a riveted retainer 13 upon one of the ball races, while the balls in the other race are not yet in place. It is a very much more difficult matter, however, to assemble the retainer upon the second row of balls with the first row of balls with its retainers in place, since riveting tools and the like cannot then be introduced from the bottom of the bearing through the space between the race members as shown in Fig. 2, because of the lower retainer 13.

In order to overcome this difficulty I employ a retainer composed of two sections 14 and 15 which are placed below and above the second row of balls respectively as shown in Fig. 2. The lower section has a series of rivets 16 extending through holes therein and secured by peening or centerpunching the material at the end of the rivet. These rivets are adapted to pass through holes 18 in the upper section.

After assembling the retainer sections loosely around the balls in the upper section as shown in Fig. 2, a dolly consisting of a shank portion 19, an intermediate portion 20 bent substantially at right angles thereto and a lip portion 21 is inserted through one of the filling notches as 11$^b$, the race member having been turned so as to bring one of the rivets 16 immediately in front of this filling notch. The shank 19 of the dolly then rests upon the upper edge of the outer race member 11 while the lip 21 engages the under side of the head on the rivet 16. By holding the outer end of the shank 19 of the dolly, the rivet 16 is firmly held while the upper head is formed as by means of the riveting tool 22.

While the dolly 19 is shown as being inserted through the filling notch 11$^b$ of the outer race member, it will be understood that it can be inserted through the filling notch 10$^b$ in the inner race member when desired.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible in view of the prior art.

What I claim as new and desire to secure by Letters Patent is:

The method of assembling riveted retainers on the balls of two-row radial ball bearings having filling notches in the race members, said method consisting of placing the two halves of said retainer on the balls in one of the races with rivets extending outwardly through openings in the outer half of the retainer, inserting a dolly through the filling notch and up under the lower end of each of the rivets in succession and riveting over the upper end of each of said rivets while it is supported by the dolly.

JOHN DLESK.